(12) United States Patent
Kajimura et al.

(10) Patent No.: US 10,718,522 B2
(45) Date of Patent: Jul. 21, 2020

(54) GAS TURBINE COMBUSTOR, GAS TURBINE, CONTROL DEVICE, AND CONTROL METHOD

(71) Applicant: MITSUBISHI HITACHI POWER SYSTEMS, LTD., Kanagawa (JP)

(72) Inventors: Shuhei Kajimura, Tokyo (JP); Satoshi Takiguchi, Tokyo (JP); Shinji Akamatsu, Kanagawa (JP); Naoki Abe, Kanagawa (JP); Kenta Taniguchi, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 836 days.

(21) Appl. No.: 15/129,947

(22) PCT Filed: Sep. 3, 2014

(86) PCT No.: PCT/JP2014/073253
§ 371 (c)(1),
(2) Date: Sep. 28, 2016

(87) PCT Pub. No.: WO2015/166597
PCT Pub. Date: Nov. 5, 2015

(65) Prior Publication Data
US 2017/0219211 A1 Aug. 3, 2017

(30) Foreign Application Priority Data
Apr. 30, 2014 (JP) .................................. 2014-094029

(51) Int. Cl.
*F23R 3/28* (2006.01)
*F02C 7/18* (2006.01)
(Continued)

(52) U.S. Cl.
CPC ................ *F23R 3/283* (2013.01); *F02C 7/18* (2013.01); *F02C 7/22* (2013.01); *F02C 7/228* (2013.01);
(Continued)

(58) Field of Classification Search
CPC .... F02C 7/18; F02C 7/22; F02C 7/228; F02C 9/00; F23R 3/28; F23R 3/283;
(Continued)

(56) References Cited

U.S. PATENT DOCUMENTS 2,715,816 A * 8/1955 Thorn ....................... F23R 3/42
60/758
3,952,501 A * 4/1976 Saintsbury ................ F23R 3/26
60/39.23

(Continued)

FOREIGN PATENT DOCUMENTS

| CN | 102695919 | 9/2012 |
| CN | 103210257 | 7/2013 |

(Continued)

OTHER PUBLICATIONS

Written Opinion dated Nov. 25, 2014 in corresponding International Application No. PCT/JP2014/073253.
(Continued)

*Primary Examiner* — Alain Chau
(74) *Attorney, Agent, or Firm* — Wenderoth, Lind & Ponack, L.L.P.

(57) ABSTRACT

To provide a gas turbine combustor that can suppress a generation amount of NOx and maintain a flame holding property, while suppressing burn damage around a pilot nozzle including the pilot nozzle. A gas turbine combustor includes a pilot nozzle that can inject fuel F and cooling air A for cooling a nozzle tip, a flow regulating valve that can adjust a flow rate of cooling air to be supplied to the pilot
(Continued)

nozzle, a detection sensor that detects a combustion state of fuel, and a control device that controls the flow regulating valve based on a detection result of the detection sensor.

15 Claims, 8 Drawing Sheets

(51) Int. Cl.
*F02C 7/228* (2006.01)
*F02C 7/22* (2006.01)
*F02C 9/00* (2006.01)
*F23R 3/36* (2006.01)
*F23R 3/26* (2006.01)
*F23R 3/34* (2006.01)

(52) U.S. Cl.
CPC ............... *F02C 9/00* (2013.01); *F23R 3/26* (2013.01); *F23R 3/286* (2013.01); *F23R 3/343* (2013.01); *F23R 3/36* (2013.01); *F05D 2270/082* (2013.01); *F23D 2209/10* (2013.01); *F23D 2209/20* (2013.01); *F23R 2900/03282* (2013.01)

(58) Field of Classification Search
CPC .. F23R 3/286; F23R 3/343; F23R 3/36; F23R 3/26; F23R 3/14; F23R 2900/03282; F23R 2900/03343; F23D 2209/10; F23D 2209/20; F05D 2270/082
See application file for complete search history.

(56) References Cited

U.S. PATENT DOCUMENTS

| | | | | |
|---|---|---|---|---|
| 4,044,549 A * | 8/1977 | Zwick | ............... | F23R 3/26 60/772 |
| 4,054,028 A * | 10/1977 | Kawaguchi | ............. | F23C 6/045 60/39.23 |
| 5,259,184 A * | 11/1993 | Borkowicz | ............. | F23D 14/00 60/39.55 |
| 5,327,718 A * | 7/1994 | Iwata | ............... | F02C 7/228 60/39.27 |
| 5,339,620 A * | 8/1994 | Ikeda | ............... | F23R 3/26 60/39.27 |
| 5,343,693 A * | 9/1994 | Komatsu | ............. | F23D 14/70 60/39.23 |
| 5,558,515 A * | 9/1996 | Althaus | ............... | F23D 11/402 431/181 |
| 5,573,395 A * | 11/1996 | Althaus | ............... | F23D 11/402 431/175 |
| 6,068,467 A * | 5/2000 | Mandai | ............... | F23D 14/02 431/174 |
| 6,070,411 A * | 6/2000 | Iwai | ............... | F23D 17/00 60/737 |
| 6,889,495 B2 * | 5/2005 | Hayashi | ............... | F23D 14/70 60/39.37 |
| 6,928,823 B2 * | 8/2005 | Inoue | ............... | F02C 7/22 60/737 |
| 7,143,583 B2 * | 12/2006 | Hayashi | ............... | F23R 3/18 60/776 |
| 7,188,476 B2 * | 3/2007 | Inoue | ............... | F02C 7/22 431/178 |
| 7,200,986 B2 * | 4/2007 | Sanders | ............... | F23N 1/022 431/354 |
| 7,200,998 B2 * | 4/2007 | Inoue | ............... | F02C 7/22 60/737 |
| 7,263,833 B2 * | 9/2007 | Sanders | ............... | F23N 1/022 60/776 |
| 7,343,745 B2 * | 3/2008 | Inoue | ............... | F02C 7/22 60/737 |
| 8,826,666 B2 | 9/2014 | Kajimura et al. | | |
| 9,163,838 B2 | 10/2015 | Takiguchi et al. | | |
| 2002/0144636 A1 * | 10/2002 | Tsumura | ............... | F23C 5/32 110/347 |
| 2003/0167771 A1 * | 9/2003 | Hayashi | ............... | F23R 3/14 60/737 |
| 2004/0000146 A1 * | 1/2004 | Inoue | ............... | F02C 7/232 60/776 |
| 2004/0035114 A1 | 2/2004 | Hayashi et al. | | |
| 2005/0034444 A1 * | 2/2005 | Sanders | ............... | F23N 1/022 60/39.23 |
| 2005/0106520 A1 * | 5/2005 | Cornwell | ............... | F23D 14/74 431/116 |
| 2007/0003897 A1 * | 1/2007 | Koizumi | ............... | F23R 3/28 431/354 |
| 2012/0167569 A1 | 7/2012 | Takiguchi et al. | | |
| 2012/0305673 A1 * | 12/2012 | Matsuyama | ............ | F23R 3/343 239/533.2 |
| 2013/0019584 A1 * | 1/2013 | Koizumi | ............... | F23R 3/28 60/39.465 |
| 2013/0061599 A1 * | 3/2013 | Van Alen | ............... | F02C 7/12 60/779 |
| 2013/0091824 A1 * | 4/2013 | Murakami | ............... | F02C 3/30 60/39.094 |
| 2014/0041389 A1 | 2/2014 | Kajimura et al. | | |
| 2014/0157785 A1 * | 6/2014 | Bathina | ............... | F23L 7/00 60/772 |
| 2014/0260305 A1 * | 9/2014 | Hobbs | ............... | F23C 9/006 60/776 |
| 2014/0283498 A1 | 9/2014 | Horikawa et al. | | |
| 2015/0226436 A1 * | 8/2015 | DeSilva | ............... | F23R 3/286 60/737 |

FOREIGN PATENT DOCUMENTS

| | | | | |
|---|---|---|---|---|
| JP | 8-74604 | | 3/1996 | |
| JP | 08074604 A | * | 3/1996 | ............... F02C 7/22 |
| JP | 2004-101071 | | 4/2004 | |
| JP | 2004-138376 | | 5/2004 | |
| JP | 2009-168397 | | 7/2009 | |
| JP | 2010-159757 | | 7/2010 | |
| JP | 2011-99654 | | 5/2011 | |
| JP | 2013-96324 | | 5/2013 | |

OTHER PUBLICATIONS

First Office Action with Search Report dated Apr. 6, 2017 in corresponding Chinese Application No. 201480077592.5, with English translation.
International Search Report dated Nov. 25, 2014 in International (PCT) Application No. PCT/JP2014/073253.

* cited by examiner

GAS TURBINE COMBUSTOR, GAS TURBINE, CONTROL DEVICE, AND CONTROL METHOD

FIELD

The present invention relates to a gas turbine combustor including an injection nozzle, a gas turbine including a gas turbine combustor, and a control device and a control method for a gas turbine combustor.

BACKGROUND

A general gas turbine is configured by a compressor, a combustor, and a turbine. Air taken in from an air inlet is compressed by a compressor, thereby becoming high-temperature and high-pressure compressed air. The combustor supplies fuel to the compressed air to burn the fuel, thereby acquiring high-temperature and high-pressure combustion gas (a working fluid). The turbine is driven by the combustion gas to drive a generator connected to the turbine.

In a conventional gas turbine combustor, a plurality of main combustion burners are arranged so as to surround a circumference of a pilot combustion burner, a pilot nozzle is incorporated in the pilot combustion burner, and a main nozzle is incorporated in the main combustion burners. The pilot combustion burner and the main combustion burners are arranged inside of an inner cylinder of the gas turbine.

As such a gas turbine combustor, there are gas turbine combustors described in Patent Literatures 1 and 2. A gas turbine combustor described in Patent Literature 1 has a configuration such that a sleeve is arranged outside of a body that forms a fuel passage, a cover ring is arranged therebetween to form an air passage inside and outside thereof, and a nozzle chip having a fuel injection hole that communicates with the fuel passage is provided at an apical end of the cover ring to configure a pilot nozzle. A gas turbine combustor described in Patent Literature 2 has a configuration such that a diffusion chip, which is a passage through which fuel, air, or an air-fuel mixture passes to function together with main and auxiliary mixing circuits, is provided in a fuel nozzle.

CITATION LIST

Patent Literatures

Patent Literature 1: Japanese Patent Application Laid-open No. 2009-168397 A

Patent Literature 2: Japanese Patent Application Laid-open No. 2010-159757 A

SUMMARY

Technical Problem

When fuel is injected from main nozzles and is combusted, circulating flow is formed by swirling flow and circulating flow of high-temperature gas (hot gas) flows into a space opposite to a nozzle tip of a pilot nozzle. Cooling air is injected to the circulating flow from the pilot nozzle. At this time, an injection amount of fuel injected from the main nozzles and the pilot nozzle changes depending on an output of a gas turbine. Therefore, a forming position of the circulating flow of the high-temperature gas approaches to the pilot nozzle or moves away therefrom and the forming position of the circulating flow becomes unstable. If the circulating flow approaches too much to the pilot nozzle, the temperature around the pilot nozzle including the pilot nozzle increases, and thus the nozzle tip of the pilot nozzle may be burn damaged and a generation amount of NOx also increases. On the other hand, if the circulating flow is too far away from the pilot nozzle, the flame holding property deteriorates and combustion becomes unstable. Further, due to a decrease of combustibility, generation of CO and unburnt combustible contents increases. Depending on the arrangement of the pilot nozzle and the main nozzles, the circulating flow of the high-temperature gas may be formed on the nozzle tip side of the main nozzles. Therefore, the main nozzles have a problem similar to that of the pilot nozzle.

Therefore, an object of the present invention is to provide a gas turbine combustor, a gas turbine, a control device, and a control method that can suppress the generation amount of NOx and maintain the flame holding property, while suppressing burn damage around an injection nozzle including the injection nozzle.

Solution to Problem

In one aspect, there is provided a gas turbine combustor comprising: an injection nozzle that can inject fuel and cooling air for cooling a nozzle tip; an air flow-rate adjustment unit that can adjust a flow rate of the cooling air to be supplied to the injection nozzle; a detection unit that detects a combustion state of the fuel; and a control device that controls the air flow-rate adjustment unit based a detection result of the detection unit.

According to this configuration, the control device can control the air flow-rate adjustment unit to adjust the flow rate of the cooling air to be injected from the injection nozzle. Therefore, a forming position of a circulating flow that flows into the front of the injection nozzle can be adjusted to an appropriate forming position according to the flow rate of the cooling air. Accordingly, it is possible to suppress the generation amount of NOx and maintain the flame holding property, while suppressing burn damage around the injection nozzle including the injection nozzle. As the detection unit that detects the combustion state of the fuel, for example, there can be mentioned an NOx detection sensor that detects the generation amount of NOx generated depending on the combustion state of the fuel, a temperature sensor that detects the temperature of a member that changes depending on the combustion state of the fuel, and a pressure sensor that detects pressure fluctuations in the combustor, which is caused depending on the combustion state of the fuel. The flow rate of the cooling air can be adjusted through the control device depending on an output of the gas turbine or an operating state quantity such as fuel proportion. Further, the injection nozzle can be the pilot nozzle or the main nozzle, and is not particularly limited.

In one aspect, the gas turbine combustor further comprises a cooling-air supply flow channel connected to the injection nozzle to supply the cooling air toward the injection nozzle, wherein the air flow-rate adjustment unit has a flow regulating valve provided in the cooling-air supply flow channel.

According to this configuration, the control device can easily adjust the flow rate of the cooling air to be injected from the injection nozzle by adjusting an opening degree of the flow regulating valve.

In one aspect, the gas turbine combustor further comprises a cooling-air supply flow channel connected to the injection nozzle to supply the cooling air toward the injection nozzle, wherein the air flow-rate adjustment unit has a compressor that supplies the cooling air toward the cooling-air supply flow channel.

According to this configuration, the control device can easily adjust the flow rate of the cooling air to be injected from the injection nozzle by controlling actuation of the compressor.

In one aspect, the injection nozzle includes a plurality of internal flow channels formed therein from a nozzle base end side to a nozzle tip side, through which the fuel and the cooling air can circulate respectively, the plurality of internal flow channels include a first fuel flow channel through which the fuel circulates toward the nozzle tip, a second fuel flow channel through which the fuel circulates toward the nozzle tip, and a cooling flow channel through which the cooling air circulates toward the nozzle tip, and the cooling flow channel is provided between the first fuel flow channel and the second fuel flow channel in a direction from an internal side toward an external side of the injection nozzle.

According to this configuration, because the cooling passage can be arranged between the first fuel gas passage and the second fuel gas passage, the cooling air can be effectively introduced to the nozzle tip depending on the shape of the injection nozzle.

In one aspect, the injection nozzle includes a plurality of internal flow channels formed therein from a nozzle base end side to a nozzle tip side, through which the fuel and the cooling air can circulate respectively, a contraction portion formed by narrowing down a part of at least one of the internal flow channels, a manifold formed on an apical end side of the contraction portion to communicate with the internal flow channel, and an injection hole that communicates with the manifold, wherein one part of the plurality of internal flow channels is a cooling flow channel through which the cooling air circulates toward the nozzle tip side.

According to this configuration, the injection nozzle can circulate the fuel and the cooling air respectively depending on the internal flow channels. Therefore, the fuel and the cooling air circulating in the internal flow channels are not mixed with each other. Further, the fuel and the cooling air circulating in the internal flow channels pass through the contraction portion. Therefore, a circulation amount of the fuel and the cooling air flowing toward the nozzle tip side is stabilized, thereby enabling to stabilize the injection amount of the fuel and the cooling air to be injected from the injection holes. The fuel and the cooling air having passed through the contraction portion pass through the manifold and are injected from the injection holes. Therefore, the fuel and the cooling air injected from the injection holes via the manifold are injected with a uniform pressure. For example, by forming the manifold in a circumferential direction and forming a plurality of injection holes in the circumferential direction along the manifold, the fuel and the cooling air injected from the injection holes can be injected with a uniform pressure in the circumferential direction.

The injection nozzle includes a nozzle body provided to extend from the nozzle base end side toward the nozzle tip side, and a plurality of swirler vanes arranged and provided around the nozzle body with a predetermined gap therebetween, and in the plurality of internal flow channels, the cooling flow channel, which is the part of the internal flow channels, is provided to extend from the nozzle base end side toward the nozzle tip side, and a fuel flow channel through which the fuel circulates, which is the other part of the internal flow channels, is provided to extend from the nozzle base end side toward the swirler vanes.

According to this configuration, the cooling air can be injected from an apical end side of the nozzle body, and the fuel can be injected from the plurality of swirler vanes.

In one aspect, the injection nozzle includes a nozzle body provided to extend from the nozzle base end side toward the nozzle tip side, and a film-air flow channel formed around the nozzle body, through which film air circulates from the nozzle base end side toward the nozzle tip side.

According to this configuration, the film air flow channel can be formed around the nozzle body.

In one aspect, the film-air flow channel communicates with an external flow channel formed outside of the nozzle body.

According to this configuration, the air taken in from the external flow channel can be used as the film air.

In one aspect, one part of the plurality of internal flow channels is the film-air flow channel provided to extend from the nozzle base end side toward the nozzle tip side.

According to this configuration, the film air flow channel can be formed as the internal flow channel of the nozzle body.

In one aspect, the cooling flow channel is provided inside of the injection nozzle with respect to the film-air flow channel.

According to this configuration, the cooling flow channel can be formed inside of the film air flow channel.

In one aspect, there is provided a gas turbine combustor comprising: a pilot nozzle, and main nozzles provided around the pilot nozzle, wherein as the pilot nozzle, the injection nozzle according to any one of claims 1 to 10 is applied.

According to this configuration, the fuel and the cooling air can be injected from the pilot nozzle. At this time, because the pilot nozzle can inject the cooling air from the nozzle tip side, the forming position of the circulating flow that flows into the front of the pilot nozzle can be adjusted to an appropriate forming position depending on the flow rate of the cooling air.

In one aspect, there is provided a gas turbine comprising: the gas turbine combustor according to any one of claims 1 to 11, and a turbine that is rotated by combustion gas generated by combusting the fuel in the gas turbine combustor.

According to this configuration, the generation amount of NOx can be suppressed and the flame holding property can be maintained, while suppressing burn damage around the injection nozzle including the injection nozzle of the gas turbine combustor. Therefore, combustion by the gas turbine combustor can be stably performed, and as a result, turbine efficiency can be improved by stable combustion.

In one aspect, there is provided a control device for a gas turbine combustor that includes an injection nozzle that can inject fuel and cooling air for cooling a nozzle tip, an air flow-rate adjustment unit that can adjust a flow rate of the cooling air to be supplied to the injection nozzle, and a detection unit that detects a combustion state of the fuel, wherein the control device controls the air flow-rate adjustment unit based on a detection result of the detection unit.

In one aspect, there is provided a control method for a gas turbine combustor that includes an injection nozzle that can inject fuel and cooling air for cooling a nozzle tip, an air flow-rate adjustment unit that can adjust a flow rate of the cooling air to be supplied to the injection nozzle, and a detection unit that detects a combustion state of the fuel, wherein the air flow-rate adjustment unit is controlled based on a detection result of the detection unit.

According to this configuration, the flow rate of the cooling air to be injected from the injection nozzle can be adjusted by controlling the air flow-rate adjustment unit. Therefore, the forming position of the circulating flow that flows into the front of the injection nozzle can be adjusted to an appropriate forming position depending on the flow rate of the cooling air.

DESCRIPTION OF EMBODIMENTS

Exemplary embodiments of the present invention will be explained below in detail with reference to the accompanying drawings. The present invention is not limited to the embodiments. In addition, constituent elements in the embodiments described below include those that can be easily replaced or assumed by persons skilled in the art, or that are substantially equivalent. Further, the constituent elements described below can be appropriately combined and when there are a plurality of embodiments, these embodiments can also be combined.

First Embodiment

Figure 1:
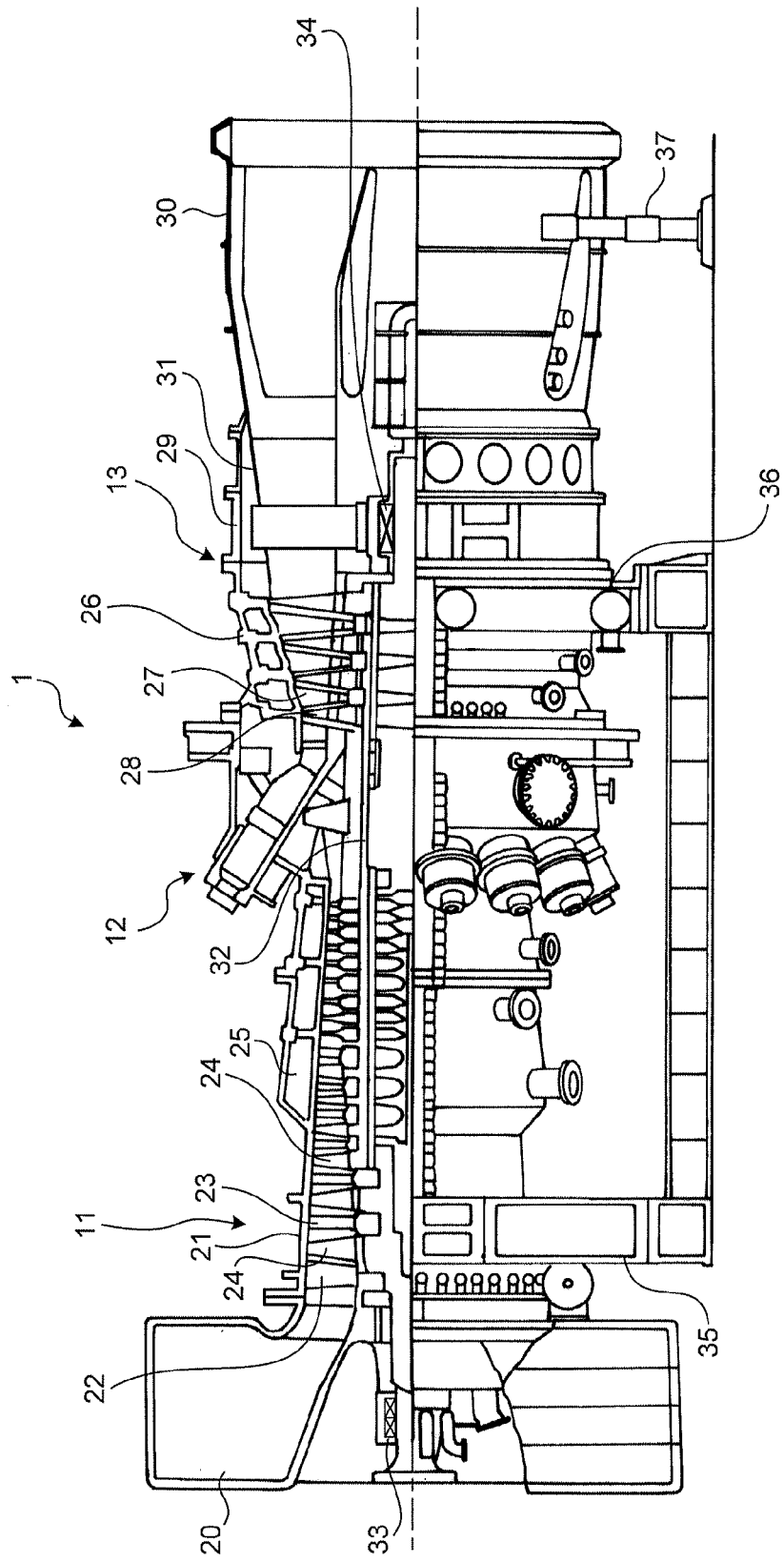
FIG. 1 is a schematic configuration diagram illustrating a gas turbine according to a first embodiment.
Figure 2:
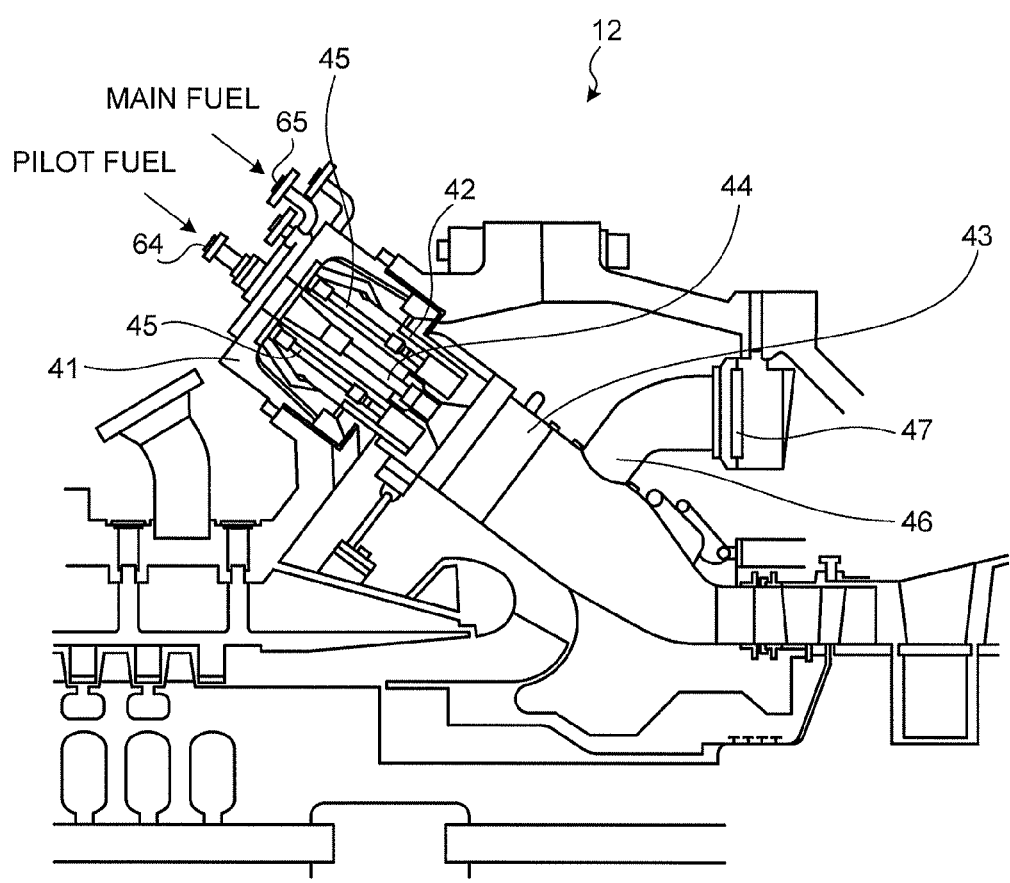
FIG. 2 is a schematic configuration diagram illustrating a gas turbine combustor according to the first embodiment.
Figure 3:
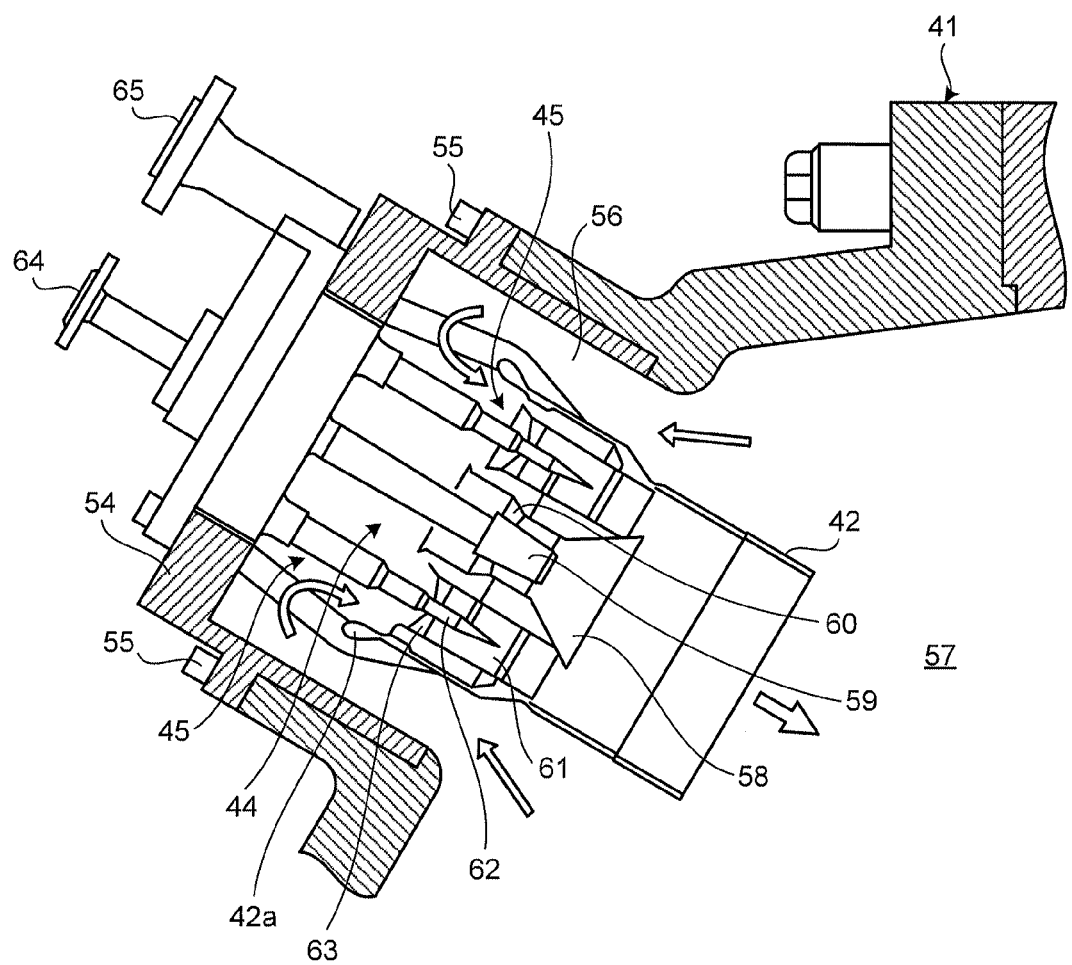
FIG. 3 is a sectional view of relevant parts in the gas turbine combustor according to the first embodiment.
Figure 4:
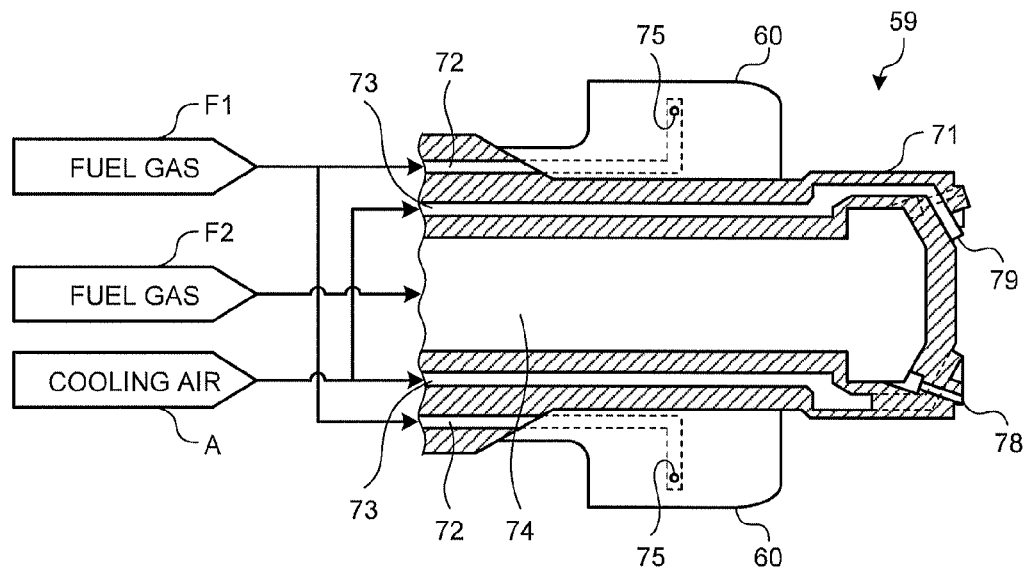
FIG. 4 is a sectional view illustrating an apical end of a pilot nozzle according to the first embodiment.
Figure 5:
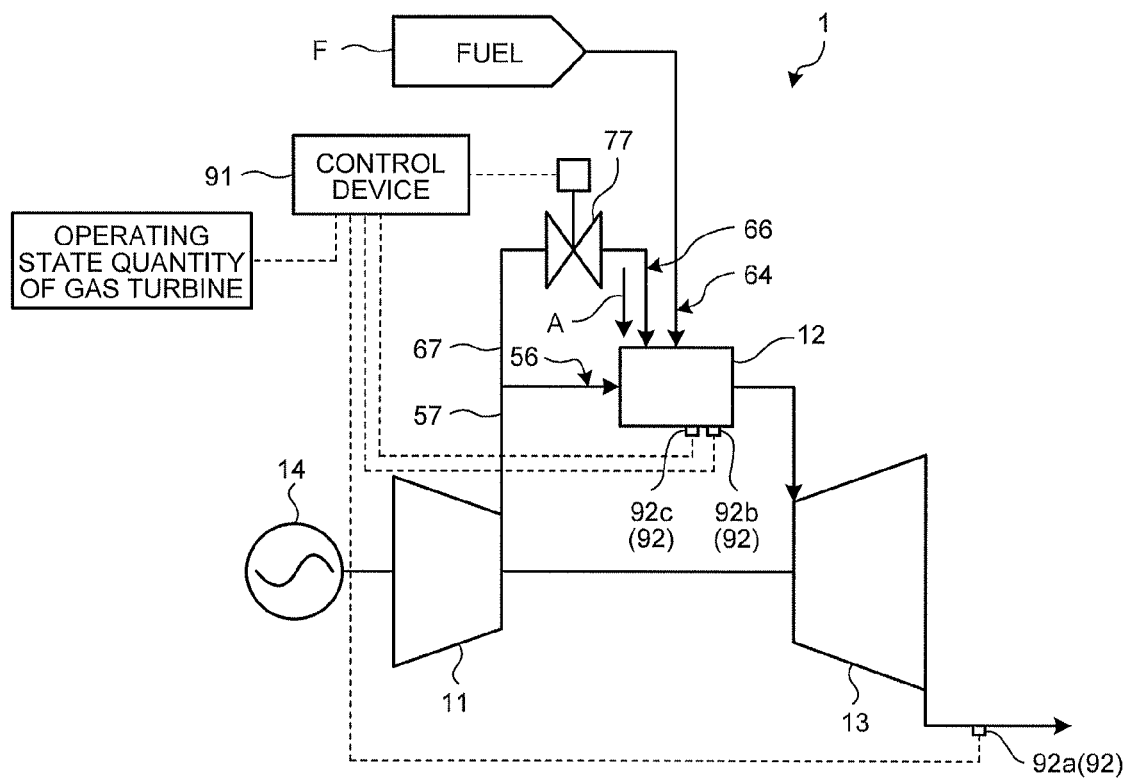
FIG. 5 is a schematic diagram illustrating the gas turbine according to the first embodiment.

FIG. 1 is a schematic configuration diagram illustrating a gas turbine according to a first embodiment. FIG. 2 is a schematic configuration diagram illustrating a gas turbine combustor according to the first embodiment. FIG. 3 is a sectional view of relevant parts in the gas turbine combustor according to the first embodiment. FIG. 4 is a sectional view illustrating an apical end of a pilot nozzle according to the first embodiment. FIG. 5 is a schematic diagram illustrating the gas turbine according to the first embodiment.

A gas turbine 1 according to the first embodiment is configured, as illustrated in FIG. 1 and FIG. 5, by a compressor 11, a combustor (gas turbine combustor) 12, and a turbine 13. A power generator 14 (see FIG. 5) is connected to the gas turbine 1 so as to be able to generate power.

The compressor 11 has an air inlet 20 that takes in air. An inlet guide vane (IGV) 22 is arranged in a compressor casing 21, a plurality of compressor vanes 23 and turbine blades 24 are alternately arranged in a front-back direction (an axial direction of a rotor 32 described later), and a bleed air chamber 25 is provided outside thereof. By supplying fuel to compressed air compressed by the compressor 11 and igniting the fuel, the combustor 12 can combust the fuel. In the turbine 13, a plurality of turbine vanes 27 and turbine blades 28 are alternately arranged in the front-back direction (the axial direction of the rotor 32 described later) in a turbine casing 26. On a downstream side of the turbine casing 26, an exhaust chamber 30 is arranged via an exhaust casing 29, and the exhaust chamber 30 has an exhaust diffuser 31 connected to the turbine 13.

The rotor (a rotary shaft) 32 is positioned so as to penetrate a central portion of the compressor 11, the combustor 12, the turbine 13, and the exhaust chamber 30. While an end of the rotor 32 on the side of the compressor 11 is supported rotatably by a bearing 33, an end thereof on the side of the exhaust chamber 30 is rotatably supported by a bearing 34. In the rotor 32, a plurality of disks attached with the respective turbine blades 24 are overlapped on each other and fixed in the compressor 11, and a plurality of disks attached with the respective turbine blades 28 are overlapped on each other and fixed in the turbine 13, and a drive shaft of the power generator 14 is connected to an end of the turbine 13 on the side of the compressor 11.

In the gas turbine 1, the compressor casing 21 of the compressor 11 is supported by a leg portion 35, the turbine casing 26 of the turbine 13 is supported by a leg portion 36, and the exhaust chamber 30 is supported by a leg portion 37.

Therefore, air taken in from the air inlet 20 of the compressor 11 passes through the inlet guide vane 22 and the plurality of compressor vanes 23 and turbine blades 24 and is compressed, to become high-temperature and high-pressure compressed air. The combustor 12 supplies predetermined fuel to the compressed air to combust the fuel. Because high-temperature and high-pressure combustion gas that is a working fluid generated by the combustor 12 passes through the plurality of turbine vanes 27 and turbine blades 28 constituting the turbine 13, the rotor 32 is driven and rotated thereby driving the power generator 14 connected to the rotor 32. Meanwhile, the combustion gas that has driven the turbine 13 passes through the exhaust diffuser 31 and is discharged from the exhaust chamber 30 to the air as flue gas.

In the combustor 12 described above, as illustrated in FIG. 2, a combustor inner cylinder 42 is arranged inside of a casing 41 with a predetermined gap therebetween, and a combustor transition piece 43 is connected to an apical end of the combustor inner cylinder 42. In the combustor inner cylinder 42, a pilot combustion burner 44 is arranged to be positioned at an inside central part thereof and a plurality of main combustion burners 45 are arranged so as to surround the pilot combustion burner 44 in a circumferential direction on an inner periphery of the combustor inner cylinder 42. The combustor transition piece 43 is connected with a bypass pipe 46 and a bypass valve 47 is provided on the bypass pipe 46.

A top hat portion 54 is fitted to the casing 41 and is fastened by a plurality of fastening bolts 55. The combustor inner cylinder 42 is arranged inside of the casing 41 with a predetermined gap therebetween, and an air passage 56 in a cylindrical shape is formed between an inner surface of the top hat portion 54 and an outer surface of the combustor inner cylinder 42. The air passage 56 communicates with a supply passage 57 of the compressed air compressed by the compressor 11 at one end thereof and communicates with a base end side of the combustor inner cylinder 42 at the other end thereof. The combustor inner cylinder 42 has a large-diameter portion 42a formed on the base end side, and thus the air passage 56 has a bell-mouth shape.

The pilot combustion burner 44 is arranged in the combustor inner cylinder 42, positioned in the central part thereof, and the plurality of main combustion burners 45 are arranged around the pilot combustion burner 44. The pilot combustion burner 44 is configured by a pilot cone 58 supported by the combustor inner cylinder 42 and a pilot nozzle 59 arranged inside of the pilot cone 58, and swirler vanes 60 are provided on an outer periphery of the pilot nozzle 59. Each of the main combustion burners 45 is configured by a burner cylinder 61 and a main nozzle 62 arranged inside of the burner cylinder 61, and swirler vanes 63 are provided on an outer periphery of the main nozzle 62.

The top hat portion 54 is provided with fuel ports 64 and 65, a pilot fuel line (not illustrated) is connected to the fuel port 64 of the pilot nozzle 59 and a main fuel line (not illustrated) is connected to the fuel port 65 of each of the main nozzles 62. Although not illustrated herein, the top hat portion 54 is provided with a cooling-air supply port 66 (see FIG. 5). As illustrated in FIG. 5, the cooling-air supply port 66 is connected to a branch passage (cooling-air supply flow channel) 67 branched from the supply passage 57 extending from the compressor 11 to the gas turbine combustor 12. That is, the supply passage 57 communicates with the air passage 56 in the gas turbine combustor 12, and the branch passage 67 branched from the supply passage 57 is connected to the cooling-air supply port 66 of the gas turbine combustor 12.

Therefore, as illustrated in FIG. 2, FIG. 3, and FIG. 5, the high-temperature and high-pressure compressed air flows into the air passage 56 and the branch passage 67 from the supply passage 57, flows into the combustor inner cylinder 42 from the air passage 56, and also flows into the cooling-air supply port 66 from the branch passage 67. In the combustor inner cylinder 42, the compressed air is mixed with the fuel injected from the main combustion burners 45 to become a swirling flow of a premixed air-fuel mixture and flows into the combustor transition piece 43. Further, in the combustor inner cylinder 42, the compressed air is mixed with the fuel injected from the pilot combustion burner 44, ignited by a pilot burner (not illustrated) and combusted to become combustion gas, and is ejected into the combustor transition piece 43. At this time, a part of the combustion gas is ejected so as to be diffused circumferentially inside of the combustor transition piece 43 with flames and combusted by being ignited by the premixed air-fuel mixture flowing into the combustor transition piece 43 from each of the main combustion burners 45. That is, flame holding for performing stable combustion of lean premixed fuel from the main combustion burners 45 is enabled by pilot flames by means of the pilot fuel injected from the pilot combustion burner 44.

A high-temperature circulating flow is generated in the pilot cone 58 due to combustion of the main fuel. The circulating flow opposingly flows into the front of the pilot nozzle 59. The forming position of the circulating flow is changed in a direction approaching to and moving away from the pilot nozzle 59 due to the cooling air injected from the pilot nozzle 59. At this time, the compressed air flowing into the cooling-air supply port 66 is used as cooling air for cooling the pilot nozzle 59.

The pilot nozzle 59 according to the first embodiment is described next in detail with reference to FIG. 4. At an apical end of the pilot nozzle 59, as illustrated in FIG. 4, a nozzle body 71 has a hollow cylindrical shape, and swirler vanes 60 are provided around the nozzle body 71. A plurality of internal flow channels are formed inside the nozzle body 71, and a first fuel passage 72, a second fuel passage 74, and a cooling passage 73 are formed as the internal flow channels.

The second fuel passage 74 is formed at the center of the shaft inside of the nozzle body 71 and is formed from a base end side to an apical end side thereof. The base end side of the second fuel passage 74 communicates with the fuel port 64, and fuel F supplied from the fuel port 64 passes through the second fuel passage 74 and is injected from the apical end of the nozzle body 71.

The cooling passage 73 is formed on an outer peripheral side of the second fuel passage 74 inside the nozzle body 71 and is formed from the bottom end side to the apical end side thereof. The cooling passage 73 communicates with the cooling-air supply port 66 on the bottom end side, and the compressed air flowing into the cooling-air supply port 66 from the compressor 11 via the supply passage 57 and the branch passage 67 circulates therethrough as cooling air A.

The first fuel passage 72 is formed on an outer peripheral side of the cooling passage 73 inside the nozzle body 71 and is formed from the bottom end side along the inside of the swirler vanes 60. The first fuel passage 72 communicates with the fuel port 64 on the bottom end side and with a first fuel injection hole 75 formed in the swirler vane 60 on the apical end side. Therefore, the fuel F supplied from the fuel port 64 passes through the first fuel passage 72 and is injected from the first fuel injection hole 75 formed in the swirler vane 60.

In this manner, the cooling passage 73 is provided between an inner side of the first fuel passage 72 and an outer side of the second fuel passage 74 in a radial direction of the nozzle body 71. The fuel F1 circulating in the first fuel passage 72 and fuel F2 circulating in the second fuel passage 74 contain fuel gas such as LNG, and become an air-fuel mixture of fuel gas and compressed air (pilot fuel).

The cooling passage 73 is connected to the supply passage 57 via the branch passage 67 and the branch passage 67 is provided with a flow regulating valve (air flow-rate adjustment unit) 77. The flow regulating valve 77 is connected to a control device 91 provided in the gas turbine 1. An opening degree of the flow regulating valve 77 is adjusted by the control device 91. An apical end of the cooling passage 73 communicates with air injection holes 79 formed in the apical end of the nozzle body 71. The air injection holes 79 are directed inward of the nozzle body 71 to inject the cooling air A to the inner side of the nozzle body 71 toward the front of the nozzle body 71.

An apical end of the second fuel passage 74 communicates with a second fuel injection holes 78 formed at the apical end of the nozzle body 71. The second fuel injection holes 78 are directed outward of the nozzle body 71 to inject the fuel F2 to the outer side of the nozzle body 71 toward the front of the nozzle body 71.

In this manner, the pilot nozzle 59 can inject the fuel F1 from the first fuel injection holes 75 in the swirler vanes 60 and the fuel F2 from the second fuel injection holes 78 of the nozzle body 71. That is, the pilot nozzle 59 can inject the fuel F1 and the fuel F2 selectively or simultaneously. Further, the pilot nozzle 59 injects the cooling air A from the air injection holes 79 of the nozzle body 71.

As described above, the bottom end of the cooling passage 73 is connected to the branch passage 67 via the cooling-air supply port 66 and the branch passage 67 is provided with the flow regulating valve 77. The control device 91 controls the flow regulating valve 77 depending on the operating state of the gas turbine 1, to adjust the flow rate of the cooling air A circulating in the branch passage 67, thereby adjusting the injection amount of the cooling air A to be injected from the air injection holes 79.

Specifically, if the forming position of the circulating flow in the pilot cone 58 is close to the pilot nozzle 59, the control device 91 increases the opening degree of the flow regulating valve 77 to increase the injection amount of the cooling air A to be injected into the pilot cone 58. On the other hand, if the forming position of the circulating flow in the pilot cone 58 is away from the pilot nozzle 59, the control device 91 decreases the opening degree of the flow regulating valve 77 to decrease the injection amount of the cooling air A to be injected into the pilot cone 58. That is, the control device 91 adjusts the opening degree of the flow regulating valve 77 according to the operating state of the gas turbine 1 (a combustion state of the fuel F).

In the first embodiment, a detection sensor 92 that detects the operating state of the gas turbine 1 is provided, and the detection sensor 92 is connected to the control device 91. As the detection sensor 92, for example, an NOx detection sensor that detects a generation amount of NOx generated depending on the combustion state of the fuel F, a gas-component detection sensor 92a that detects CO generated depending on the combustion state of the fuel F or unburnt hydrocarbon, a temperature sensor 92b that detects the temperature of members constituting the gas turbine combustor 12 that changes depending on the combustion state of the fuel F, or a pressure sensor 92c that detects pressure fluctuations in the combustor inner cylinder 42 can be applied. The control device 91 adjusts the opening degree of the flow regulating valve 77 based on a detection result of the detection sensor 92. The opening degree of the flow regulating valve 77 (that is, the flow rate of the cooling air A) can be adjusted by the control device 91 according to the operating state quantity such as an output of the gas turbine or fuel proportion.

Specifically, when the detection sensor 92 is the pressure sensor 92c, the control device 91 decreases the opening degree of the flow regulating valve 77 along with an increase of the pressure fluctuations detected by the pressure sensor 92c, thereby decreasing the injection amount of the cooling air A from the air injection holes 79.

When the detection sensor 92 is the temperature sensor 92b and if the temperature detected by the temperature sensor 92b is higher than a preset set temperature, the control device 91 increases the opening degree of the flow regulating valve 77 to increase the injection amount of the cooling air A from the airinjection holes 79.

The detection sensor 92 can be any sensor that can detect the operating state of the gas turbine 1, that is, the combustion state of the fuel F.

Combustion in the pilot nozzle 59 according to the first embodiment is described next. In the pilot nozzle 59, as illustrated in FIG. 4, the air-fuel mixture (fuel) F1 injected from the first fuel injection holes 75 in the swirler vanes 60 and the air-fuel mixture (fuel) F2 injected from the second fuel injection holes 78 of the nozzle body 71 are ignited by a pilot burner (not illustrated) and combusted to become high-temperature combustion gas, and ejected so as to be diffused circumferentially with flames. Further, the cooling air A passing through the cooling passage 73 is injected to the inner side of the nozzle body 71, thereby adjusting the forming position of the circulating flow by the cooling air A.

At this time, the control device 91 adjusts the opening degree of the flow regulating valve 77 based on the detection result of the detection sensor 92 to adjust the injection amount of the cooling air A to be injected from the air injection holes 79 to the pilot cone 58. Therefore, if the circulating flow approaches the pilot nozzle 59, the injection amount of the cooling air A injected from the air injection holes 79 is increased, thereby enabling to keep away the forming position of the circulating flow flowing into the front of the pilot nozzle 59 rearward by the increased cooling air A. On the other hand, if the circulating flow is away from the pilot nozzle 59, the injection amount of the cooling air A injected from the air injection holes 79 is decreased, thereby enabling to move the forming position of the circulating flow flowing into the front of the pilot nozzle 59 close to the pilot nozzle 59 by the decreased cooling air A. In this manner, the control device 91 can adjust the forming position of the circulating flow by adjusting the flow regulating valve 77.

As described above, according to the first embodiment, the control device 91 can adjust the injection amount of the cooling air A to be injected from the pilot nozzle 59 by controlling the flow regulating valve 77 based on the detection result of the detection sensor 92. Therefore, the forming position of the circulating flow flowing into the front of the pilot nozzle 59 can be adjusted to an appropriate forming position by the flow rate of the cooling air A. Accordingly, the generation amount of NOx, CO, or unburnt combustible contents can be suppressed and the flame holding property can be maintained, while suppressing burn damage around the pilot nozzle 59 including the pilot nozzle 59.

According to the first embodiment, the control device 91 can adjust the flow rate of the cooling air A to be injected from the pilot nozzle 59 easily by adjusting the opening degree of the flow regulating valve 77.

Furthermore, according to the first embodiment, because the cooling passage 73 can be arranged between the first fuel passage 72 and the second fuel passage 74, the cooling air A can be effectively supplied to the nozzle tip depending on the shape of the pilot nozzle 59.

Second Embodiment

A gas turbine combustor 110 according to a second embodiment is described next with reference to FIG. 6. FIG. 7 is a schematic diagram illustrating a gas turbine according to the second embodiment. In the second embodiment, to avoid redundant explanations, portions different from those of the first embodiment are described, and portions having identical configurations as those of the first embodiment are denoted and described by like reference signs. In the first embodiment, the control device 91 controls the flow regulating valve 77, thereby adjusting the flow rate of the cooling air A circulating in the cooling passage 73. In the second embodiment, a compressor 111 is provided instead of the flow regulating valve 77, and the control device 91 controls the compressor 111 to adjust the flow rate of the cooling air A circulating in the cooling passage 73.

Figure 6:
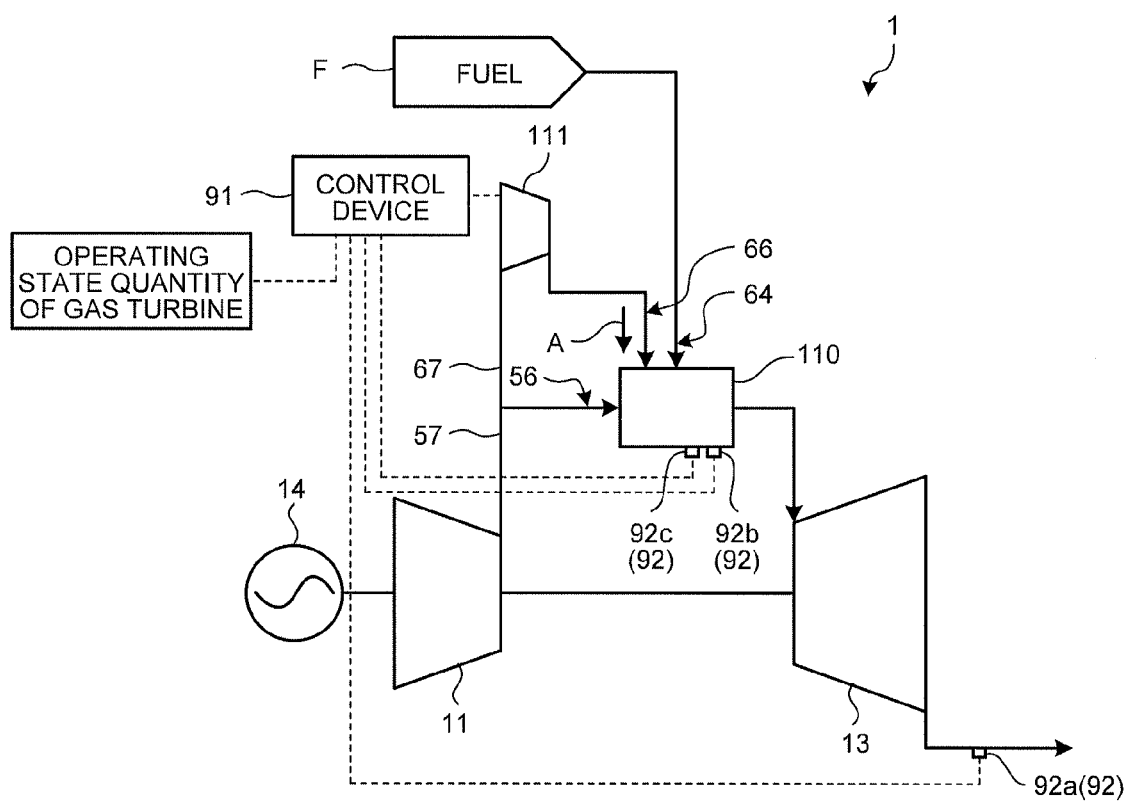
FIG. 6 is a schematic diagram illustrating a gas turbine according to a second embodiment.
Figure 7:
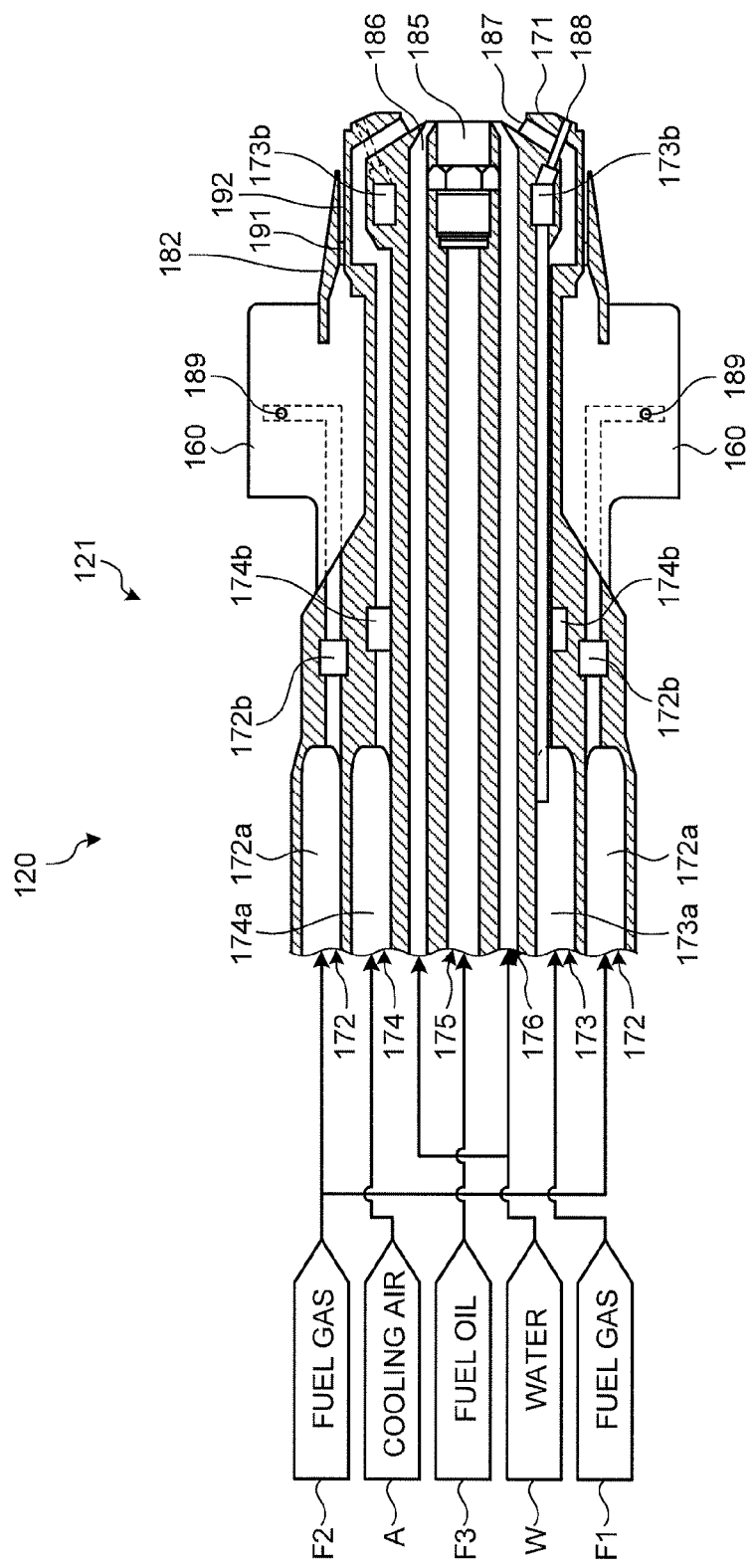
FIG. 7 is a sectional view illustrating an apical end of a pilot nozzle according to a third embodiment.

As illustrated in FIG. 6, in the gas turbine combustor 110 according to the second embodiment, the bottom end of the cooling passage 73 is connected to the branch passage 67 via the cooling-air supply port 66, and the compressor 111 is provided in the branch passage 67. An inflow port side of the compressor 111 is connected to the side of the compressor 11 and an outflow port side thereof is connected to the side of the gas turbine combustor 110. The control device 91 controls the compressor 111 depending on the operating state of the gas turbine 1 to adjust the flow rate of the cooling air A circulating in the branch passage 67, thereby adjusting the injection amount of the cooling air A to be injected from the air injection holes 79. Specifically, if the forming position of the circulating flow in the pilot cone 58 is close to the pilot nozzle 59, the control device 91 increases the number of revolutions of the compressor 111 to increase the injection amount of the cooling air A to be injected into the pilot cone 58. On the other hand, if the forming position of the circulating flow in the pilot cone 58 is away from the pilot nozzle 59, the control device 91 decreases the number of revolutions of the compressor 111 to decrease the injection amount of the cooling air A to be injected into the pilot cone 58. That is, the control device 91 adjusts the number of revolutions of the compressor 111 according to the operating state of the gas turbine 1 (the combustion state of the fuel F).

As described above, according to the second embodiment, the control device 91 can adjust the flow rate of the cooling air A to be injected from the pilot nozzle 59 by controlling the compressor 111 based on the detection result of the detection sensor 92. Therefore, the forming position of the circulating flow flowing into the front of the pilot nozzle 59 can be adjusted to an appropriate forming position by the flow rate of the cooling air A. Accordingly, the generation amount of NOx, CO, or unburnt combustible contents can be suppressed and the flame holding property can be maintained, while suppressing burn damage around the pilot nozzle 59 including the pilot nozzle 59.

Furthermore, according to the second embodiment, the control device 91 can adjust the injection amount of the cooling air A to be injected from the pilot nozzle 59 easily by controlling the actuation of the compressor 111. At this time, as compared to the case where the flow regulating valve 77 is provided in the branch passage 67 as in the first embodiment, the pressure in the cooling passage 73 can be increased, thereby enabling to adjust the injection amount of the cooling air A in a wider range.

In the second embodiment, the flow regulating valve 77 according to the first embodiment is omitted. However, the flow regulating valve 77 can be provided in the branch passage 67 on the downstream side of the compressor 111. In this case, the control device 91 adjusts the injection amount of the cooling air A by appropriately controlling the flow regulating valve 77 and the compressor 111.

In the first and second embodiments, the first fuel passage 72, the second fuel passage 74, and the respective cooling passages 73 are provided inside of the pilot nozzle 59. However, the configuration is not limited thereto, and a plurality of internal flow channels can be formed appropriately depending on the type or the like of the fuel F to be used or the gas turbine combustor 12 or 110.

Third Embodiment

A gas turbine combustor 120 according to a third embodiment is described next with reference to FIG. 7. FIG. 7 is a sectional view illustrating an apical end of a pilot nozzle according to the third embodiment. In the third embodiment also, to avoid redundant explanations, portions different from those of the first and second embodiments are described, and portions having identical configurations as those of the first and second embodiments are denoted and described by like reference signs. In the first and second embodiments, the pilot nozzle 59 illustrated in FIG. 4 is applied as the pilot nozzle. In the third embodiment, a pilot nozzle 121 illustrated in FIG. 7 is applied.

The pilot nozzle 121 according to the third embodiment can inject as fuel, the fuel gases F1 and F2 and fuel oil F3 selectively or simultaneously. Therefore, the fuel port 64 communicating with the pilot nozzle 121 is configured to include a line for supplying the fuel oil F3 and lines for supplying the fuel gases F1 and F2, so that the fuel gases F1 and F2 and the fuel oil F3 can be supplied toward the pilot nozzle 121. The pilot nozzle 121 according to the third embodiment is specifically described with reference to FIG. 7.

As illustrated in FIG. 7, the pilot nozzle 121 has a nozzle body 171 and a sleeve 182 provided on an outer periphery of the nozzle body 171 on an apical end side thereof. A plurality of swirler vanes 160 identical to those of the first embodiment are arranged and provided around the nozzle body 171 with a predetermined gap therebetween in a circumferential direction.

The nozzle body 171 has a hollow cylindrical shape and a plurality of internal flow channels are formed inside the nozzle body 171, and a first fuel gas passage 173, a second fuel gas passage 172, a cooling passage 174, a fuel oil passage 175, and a water passage 176 are formed as the internal flow channels.

The fuel oil passage 175 is formed at the center of the shaft inside of the nozzle body 171 and is formed from a base end side to an apical end side thereof. The base end side of the fuel oil passage 175 communicates with the fuel port 64, and the fuel oil F3 that flows in via the fuel port 64 circulates therethrough. The apical end side of the fuel oil passage 175 communicates with a fuel-oil injection portion 185 formed at the center of the apical end of the nozzle body 171. The fuel-oil injection portion 185 is formed at the center of the apical end of the nozzle body 171 and injects the fuel oil F3 toward the front of the nozzle body 171.

The water passage 176 is formed in a cylindrical shape along an outer periphery of the fuel oil passage 175 inside the nozzle body 171 and is formed from the base end side to the apical end side thereof. A base end side of the water passage 176 is connected to a water supply source (not illustrated), and water W supplied from the water supply source circulates therethrough. An apical end side of the water passage 176 communicates with a water injection hole 186 formed at the apical end of the nozzle body 171. The water injection hole 186 is formed in a plurality of numbers to be arranged with a predetermined gap therebetween in the circumferential direction along an outer periphery of the fuel-oil injection portion 185 at the apical end of the nozzle body 171. Each of the water injection holes 186 is directed inward (toward the center) of the nozzle body 171 and injects the water W to the inner side of the nozzle body 171 toward the front of the nozzle body 171.

The cooling passage 174 is formed on an outer peripheral side of the water passage 176 inside the nozzle body 171, and is formed from the base end side to the apical end side thereof. A base end side of the cooling passage 174 communicates with the cooling-air supply port 66 and compressed air that flows in from the compressor 11 via the cooling-air supply port 66 circulates therethrough as the cooling air A. An apical end side of the cooling passage 174 communicates with an air injection hole 187 formed at the apical end of the nozzle body 171. The air injection hole 187 is formed in a plurality of numbers to be arranged with a predetermined gap therebetween in the circumferential direction along an outer periphery of the water injection holes 186 at the apical end of the nozzle body 171. Each of the air injection holes 187 is directed inward of the nozzle body 171 and injects the cooling air A to the inner side of the nozzle body 171 toward the front of the nozzle body 171.

The first fuel gas passage 173 is formed on the outer peripheral side of the water passage 176 inside the nozzle body 171, and is provided in parallel with the cooling passage 174 along the circumferential direction and is formed from the base end side to the apical end side of the nozzle body 171. A base end side of the first fuel gas passage 173 communicates with the fuel port 64 and the fuel gas F1 that flows in via the fuel port 64 circulates therethrough. An apical end side of the first fuel gas passage 173 communicates with a first fuel-gas injection hole 188 formed at the apical end of the nozzle body 171. The first fuel-gas injection hole 188 is formed in a plurality of numbers to be arranged with a predetermined gap therebetween in the circumferential direction along an outer periphery of the air injection hole 187, at the apical end of the nozzle body 171. Each of the first fuel-gas injection holes 188 is directed outward of the nozzle body 171 to inject the fuel gas F1 to the outer side of the nozzle body 171 toward the front of the nozzle body 171.

The second fuel gas passage 172 is formed on the outer peripheral side of the cooling passage 174 and the first fuel gas passage 173 inside the nozzle body 171, and is formed from the base end side of the nozzle body 171 along the inside of the swirler vanes 160. A base end side of the second fuel gas passage 172 communicates with the fuel port 64 and the fuel gas F2 that flows in via the fuel port 64 circulates therethrough. An apical end side of the second fuel gas passage 172 communicates with a plurality of second fuel-gas injection holes 189 formed in the plurality of swirler vanes 160. The second fuel-gas injection holes 189 inject the fuel gas F2 toward the front of the swirler vanes 160.

In this manner, the respective injection holes (injection portions) 185, 186, 187, 188, and 189 are formed so that the injection directions of the fluids such as the fuel gas F1, the fuel gas F2, the fuel oil F3, the cooling air A, and the water W are made different.

The sleeve 182 is formed in a cylindrical shape along the outer periphery of the nozzle body 171 and is arranged concentrically with the nozzle body 171 with a predetermined gap therebetween. That is, the nozzle body 171 and the sleeve 182 keep a predetermined gap therebetween by interposing a plurality of spacers 191 with a predetermined gap therebetween in the circumferential direction. The gap between the nozzle body 171 and the sleeve 182 becomes a film air passage (film-air flow channel) 192 through which film air circulates.

The film air passage 192 is formed on the outer periphery of the nozzle body 171 and is formed from the base end side to the apical end side thereof. A base end side of the film air passage 192 communicates with the air passage (external flow channel) 56 and a part of the compressed air that flows into the air passage 56 from the compressor 11 via the supply passage 57 circulates as film air. The film air passage 192 injects the film air toward the front of the nozzle body 171 along the outer periphery of the nozzle body 171.

Contraction portions 172a, 173a, and 174a are respectively formed in the second fuel gas passage 172, the first fuel gas passage 173, and the cooling passage 174, of the plurality of internal flow channels of the nozzle body 171 described above, by narrowing down the respective passages so that a passage area thereof decreases.

The contraction portion 172a of the second fuel gas passage 172 has a circular cross section, and a plurality of contraction portions 172a are formed to be arranged along the circumferential direction of the nozzle body 171 with a predetermined gap therebetween (at a regular interval). The contraction portion 173a of the first fuel gas passage 173 and the contraction portion 174a of the cooling passage 174 have a circular cross section similarly to the contraction portion 172a of the second fuel gas passage 172, and are formed in a plurality of numbers to be arranged along the circumferential direction of the nozzle body 171 with a predetermined gap therebetween (at a regular interval). The contraction portion 173a of the first fuel gas passage 173 and the contraction portion 174a of the cooling passage 174 are formed on the inner peripheral side of the contraction portions 172a of the second fuel gas passage 172 and are arranged alternately along the circumferential direction.

In this manner, the plurality of contraction portions 172a, 173a, and 174a are provided such that the plurality of contraction portions 172a of the second fuel gas passage 172, which are one part of the contraction portions 172a, 173a, and 174a, are arrayed in the circumferential direction, and the contraction portions 173a of the first fuel gas passage 173 and the contraction portions 174a of the cooling passage 174 which are the other part of the contraction portions 172a, 173a, and 174a, are arrayed in the circumferential direction. The plurality of contraction portions 172a as one part thereof and the plurality of contraction portions 173a and 174a as the other part thereof are provided concentrically.

In the second fuel gas passage 172, the first fuel gas passage 173, and the cooling passage 174 of the plurality of internal flow channels of the nozzle body 171 described above, manifolds 172b, 173b, and 174b are respectively formed between each passage and each injection hole. The manifold 172b of the second fuel gas passage 172 is formed on an apical end side of the contraction portion 172a. That is, the manifold 172b of the second fuel gas passage 172 is formed on a downstream side of the contraction portion 172a in a flow direction of the fuel gas F2 that circulates in the second fuel gas passage 172.

The manifold 172b of the second fuel gas passage 172 is formed over the whole circumference of the nozzle body 171 in an annular shape. The manifold 172b communicates with the plurality of contraction portions 172a on an upstream side (the base end side) and with the plurality of second fuel-gas injection holes 189 on the downstream side (the apical end side).

The manifold 174b of the cooling passage 174 is formed on the downstream side of the contraction portion 174a in the flow direction of the cooling air A that circulates in the cooling passage 174. The manifold 174b of the cooling passage 174 is formed over the whole circumference of the nozzle body 171 in an annular shape, similarly to the manifold 172b. The manifold 174b is formed on the inner side than the manifold 172b and on the apical end side than the manifold 172b. The manifold 174b communicates with the plurality of contraction portions 174a on the upstream side (the base end side) and with the plurality of air injection holes 187 on the downstream side (the apical end side).

The manifold 173b of the first fuel gas passage 173 is formed on the downstream side of the contraction portion 173a in a flow direction of the fuel gas F1 that circulates in the first fuel gas passage 173. The manifold 173b of the first fuel gas passage 173 is formed over the whole circumference of the nozzle body 171 in an annular shape, similarly to the manifold 172b and the manifold 174b. The manifold 173b is formed on the apical end side than the manifold 174b. The manifold 173b communicates with the plurality of contraction portions 173a on the upstream side (the base end side) and with the plurality of first fuel-gas injection holes 188 on the downstream side (the apical end side).

In this manner, the plurality of manifolds 172b, 173b, and 174b are formed sequentially from the base end side to the apical end side of the nozzle body 171 in order of the manifolds 172b of the second fuel gas passage 172, the manifolds 174b of the cooling passage 174, and the manifolds 173b of the first fuel gas passage 173. Therefore, the manifolds 172b, 173b, and 174b are formed so that the positions thereof are different from each other in the direction connecting the base end side and the apical end side of the nozzle body 171.

Fluids such as the fuel gas F1, the fuel gas F2, the fuel oil F3, the cooling air A, and the water W that circulate in the respective passages 172, 173, 174, 175, and 176 in the pilot nozzle 121 according to the third embodiment are described next.

The fuel oil F3 that flows into the fuel oil passage 175 from the fuel port 64 circulates in the fuel oil passage 175 and is injected from the fuel-oil injection portion 185 formed at the center of the nozzle body 171 toward the front of the nozzle body 171.

The water W that flows into the water passage 176 from the water supply source circulates in the water passage 176 and is injected from the plurality of water injection holes 186 formed around the fuel-oil injection portion 185 of the nozzle body 171 toward the front of the nozzle body 171 and to the inner side of the nozzle body 171.

The cooling air A that flows into the cooling passage 174 from the cooling-air supply port 66 circulates in the cooling passage 174. At this time, the cooling air A passes through the contraction portion 174a of the cooling passage 174, thereby stabilizing a circulation amount of the cooling air A flowing toward the apical end side. Thereafter, the cooling air A passes through the manifold 174b to circulate over the whole circumference of the nozzle body 171. The cooling air A that has passed through the manifold 174b is injected from the air injection holes 187 formed around the water injection holes 186 in the nozzle body 171 toward the front of the nozzle body 171 and to the inner side of the nozzle body 171.

The fuel gas F1 that flows into the first fuel gas passage 173 from the fuel port 64 circulates in the first fuel gas passage 173. At this time, the fuel gas F1 passes through the contraction portion 173a of the first fuel gas passage 173, thereby stabilizing a circulation amount of the fuel gas F1 flowing toward the apical end side. Thereafter, the fuel gas F1 passes through the manifold 173b to circulate over the whole circumference of the nozzle body 171. The fuel gas F1 that has passed through the manifold 173b is injected from the first fuel-gas injection holes 188 formed around the air injection holes 187 in the nozzle body 171 toward the front of the nozzle body 171 and to the outer side of the nozzle body 171.

The fuel gas F2 that flows into the second fuel gas passage 172 from the fuel port 64 circulates in the second fuel gas passage 172. At this time, the fuel gas F2 passes through the contraction portion 172a of the second fuel gas passage 172, thereby stabilizing a circulation amount of the fuel gas F2 flowing toward the apical end side. Thereafter, the fuel gas F2 passes through the manifold 172b to circulate over the whole circumference of the nozzle body 171. The fuel gas F2 that has passed through the manifold 172b is injected from the second fuel-gas injection holes 189 in the swirler vanes 160 provided around the nozzle body 171 toward the front of the nozzle body 171.

The film air that flows into the film air passage 192 from the air passage 56 circulates in the film air passage 192 and is injected toward the front of the nozzle body 171 along the outer periphery of the nozzle body 171.

As described above, according to the third embodiment, the fuel gas F1, the fuel gas F2, the fuel oil F3, the cooling air A, and the water W that are fluids can be circulated without being mixed, according to the second fuel gas passage 172, the first fuel gas passage 173, the cooling passage 174, the fuel oil passage 175, and the water passage 176 that are the plurality of internal flow channels in the nozzle body 171. Further, because the fuel gas F1, the fuel gas F2, and the cooling air A that circulate in the second fuel gas passage 172, the first fuel gas passage 173, and the cooling passage 174 respectively pass through the contraction portions 172a, 173a, and 174a, the circulation amount thereof toward the apical end side can be stabilized. Accordingly, the injection amount injected from the second fuel-gas injection holes 189, the first fuel-gas injection holes 188, and the air injection holes 187 can be stabilized.

According to the third embodiment, the fuel gas F1, the fuel gas F2, and the cooling air A having passed through the contraction portions 172a, 173a, and 174a pass through the manifolds 172b, 173b, and 174b, respectively, and are injected from the second fuel-gas injection holes 189, the first fuel-gas injection holes 188, and the air injection holes 187. Therefore, the fuel gas F1, the fuel gas F2, and the cooling air A injected from the second fuel-gas injection holes 189, the first fuel-gas injection holes 188, and the air injection holes 187 via the manifolds 172b, 173b, and 174b can be injected in the circumferential direction with a uniform pressure.

According to the third embodiment, in the direction connecting the base end side and the apical end side of the nozzle body 171, the manifolds 172b, 173b, and 174b can be formed with a positional deviation from each other. Therefore, the manifolds 172b, 173b, and 174b are formed not to be overlapped on each other in the radial direction of the nozzle body 171, and the nozzle body 171 can have a compact configuration.

According to the third embodiment, because the respective injection holes (injection portions) 185, 186, 187, 188, and 189 can be formed so that the injection directions of fluids such as the fuel gas F1, the fuel gas F2, the fuel oil F3, the cooling air A, and the water W are made different from each other, the injection shape of the fluids can be an arbitrary shape.

According to the third embodiment, because the plurality of contraction portions 172a, 173a, and 174a can be arranged circumferentially and concentrically, the contraction portions 172a, 173a, and 174a can be arranged without intersecting with each other.

According to the third embodiment, because the fluids such as the fuel gas F1, the fuel gas F2, the fuel oil F3, the cooling air A, and the water W can be injected, the fuel oil F3 can be combusted to generate combustion gas, the fuel gases F1 and F2 can be combusted to generate combustion gas, and the nozzle body 71 can be cooled by the water W and the cooling air A. Therefore, a pilot nozzle having high versatility can be acquired.

According to the third embodiment, the pilot nozzle 121 can inject the fuel gas F1, the fuel gas F2, the fuel oil F3, the cooling air A, and the water W that circulate in the respective passages 172, 173, 174, 175, and 176 with a uniform pressure without mixing the fluids with each other, from the respective injection holes (injection portions) 185, 186, 187, 188, and 189 in a state where the injection amount is stabilized. Therefore, combustion of the pilot nozzle 121 can be performed stably. Consequently, combustion by the gas turbine combustor 12 can be performed stably, thereby enabling to improve the turbine efficiency by the stable combustion.

According to the third embodiment, the second fuel gas passage 172, the first fuel gas passage 173, the cooling passage 174, the fuel oil passage 175, and the water passage 176 are formed as the plurality of internal flow channels. However, the configuration is not limited thereto, and a passage through which another fluid passes can be formed or a part of the passages can be omitted.

Fourth Embodiment

Figure 8:
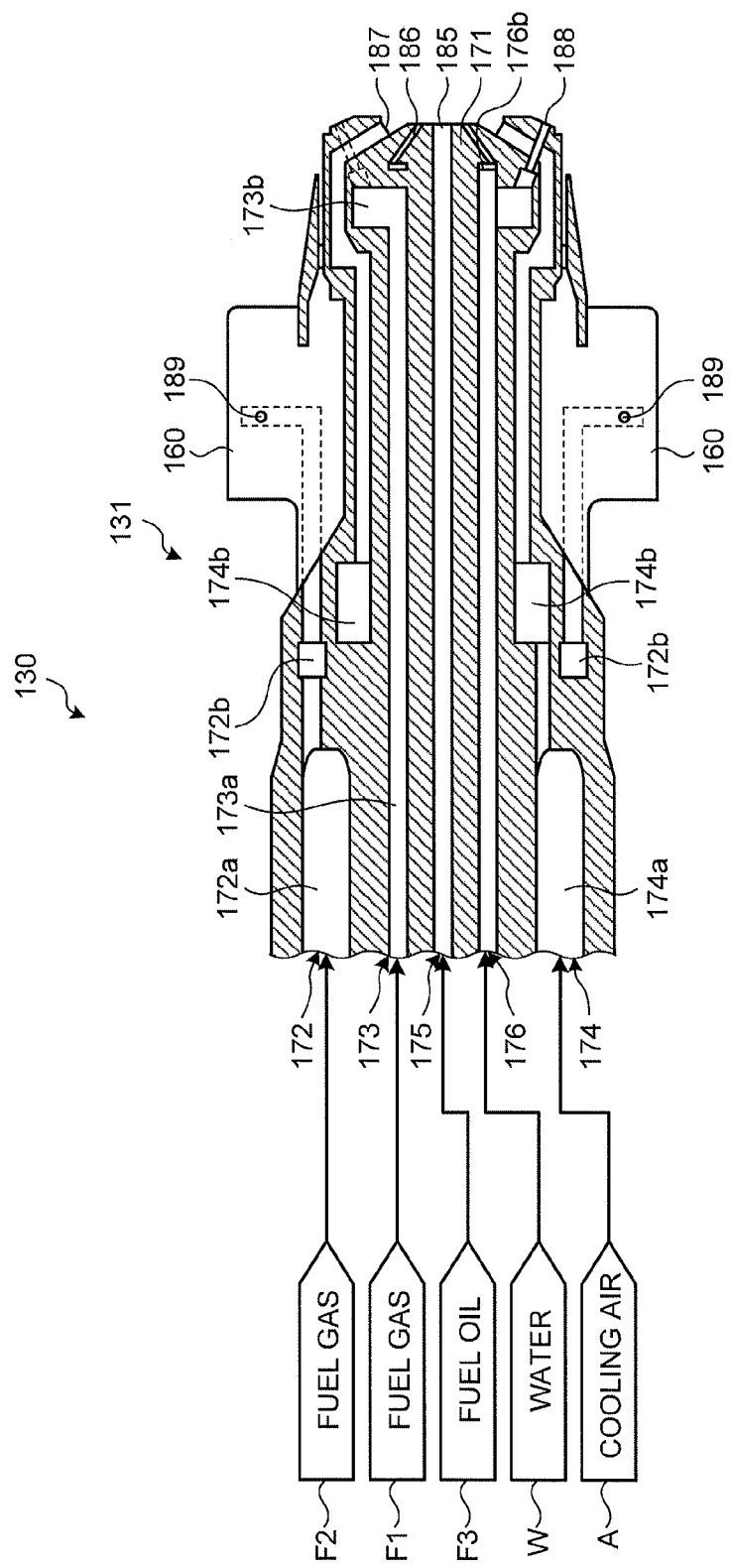
FIG. 8 is a sectional view illustrating an apical end of a pilot nozzle according to a fourth embodiment.

A gas turbine combustor 130 according to a fourth embodiment is described with reference to FIG. 8. FIG. 8 is a sectional view illustrating an apical end of a pilot nozzle according to the fourth embodiment. In the fourth embodiment also, to avoid redundant explanations, portions different from those of the first to third embodiments are described, and portions having identical configurations as those of the first to third embodiments are denoted and described by like reference signs. In the pilot nozzle 121 according to the third embodiment, the water passage 176 is formed in a cylindrical shape along the outer periphery of the fuel oil passage 175. However, in a pilot nozzle 131 according to the fourth embodiment, the water passage 176 is formed on an outer peripheral side of the fuel oil passage 175.

As illustrated in FIG. 8, in the pilot nozzle 131 of the fourth embodiment, the nozzle body 171 has a hollow cylindrical shape, and the swirler vanes 160 are provided around the nozzle body 171 similarly to the third embodiment. In the nozzle body 171, the fuel oil passage 175, the first fuel gas passage 173 and the water passage 176, and the second fuel gas passage 172 and the cooling passage 174 are sequentially formed from the inside (the center side) toward the outside. The fuel oil passage 175 is substantially identical to that of the first embodiment, and thus descriptions thereof are omitted.

The first fuel gas passage 173 is formed on the outer peripheral side of the fuel oil passage 175 in the nozzle body 171, and the water passage 176 is also formed on the outer peripheral side of the fuel oil passage 175 inside the nozzle body 171. The first fuel gas passage 173 and the water passage 176 are provided in a parallel array along the circumferential direction of the nozzle body 171.

The second fuel gas passage 172 is formed on the outer peripheral side of the first fuel gas passage 173 and the water passage 176 inside the nozzle body 171, and the cooling passage 174 is also formed on the outer peripheral side of the first fuel gas passage 173 and the water passage 176 inside the nozzle body 171. The second fuel gas passage 172 and the cooling passage 174 are provided in a parallel array along the circumferential direction of the nozzle body 171.

As in the third embodiment, in the pilot nozzle 131 illustrated in FIG. 8, the contraction portions 172a, 173a, and 174a and the manifolds 172b, 173b, and 174b are respectively formed in the second fuel gas passage 172, the first fuel gas passage 173, and the cooling passage 174. The contraction portions 172a, 173a, and 174a and the manifolds 172b, 173b, and 174b are identical to those of the third embodiment, and thus descriptions thereof are omitted. Further, as illustrated in FIG. 8, in the pilot nozzle 131 according to the fourth embodiment, a manifold 176b is formed in the water passage 176. The manifold 176b of the water passage 176 is formed on the apical end side of the nozzle body 171 than other manifolds 172b, 173b, and 174b. The manifold 176b of the water passage 176 is formed over the entire periphery of the nozzle body 171 in an annular shape. The manifold 176b is formed inward of the manifold 174b, as illustrated in FIG. 8, and is formed on the apical end side than the manifold 174b. The manifold 176b communicates with the plurality of water injection holes 186 on the downstream side (the apical end side) thereof.

As described above, according to the fourth embodiment, the plurality of internal flow channels can be arranged in a pattern different from those of the first embodiment.

Fifth Embodiment

Figure 9:
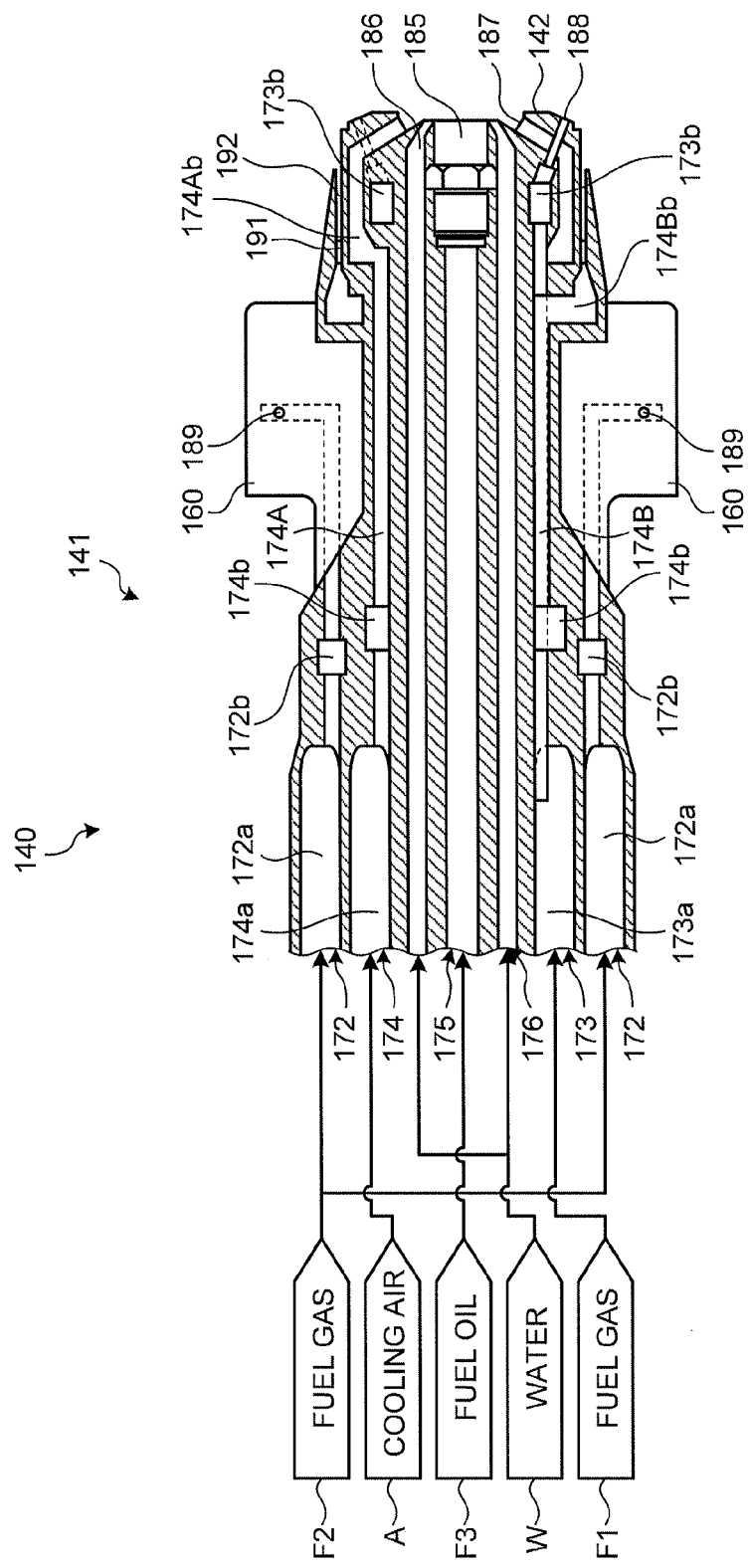
FIG. 9 is a sectional view illustrating an apical end of a pilot nozzle according to a fifth embodiment.

A gas turbine combustor 140 according to a fifth embodiment is described next with reference to FIG. 9. FIG. 9 is a sectional view illustrating an apical end of a pilot nozzle according to the fifth embodiment. In the fifth embodiment also, to avoid redundant explanations, portions different from those of the first to fourth embodiments are described, and portions having identical configurations as those of the first to fourth embodiments are denoted and described by like reference signs. In the pilot nozzles 121 and 131 according to the third and fourth embodiments, the film air passage 192 is formed so as to communicate with the air passage 56, which is the external flow channel outside of the nozzle body 171. However, in a pilot nozzle 141 according to the fifth embodiment, the film air passage 192 is an internal flow channel of a nozzle body 142. In other words, the film air passage 192, which is an external flow channel in the pilot nozzles 121 and 131 according to the third and fourth embodiments, is an internal flow channel in the fifth embodiment.

Specifically, as illustrated in FIG. 9, the nozzle body 142 of the pilot nozzle 131 is provided with a plurality of internal flow channels formed therein. The first fuel gas passage 173, the second fuel gas passage 172, a cooling passage (cooling flow channel) 174A, a film air passage (film-air flow channel) 174B, the fuel oil passage 175, and the water passage 176 are formed as the internal flow channels. In the fifth embodiment, because the first fuel gas passage 173, the second fuel gas passage 172, the fuel oil passage 175, and the water passage 176 are identical to those of the third embodiment, descriptions thereof are omitted. The fifth embodiment has a configuration in which the sleeve 182 according to the third embodiment is omitted (in other words, the sleeve is integrated with the nozzle body 142) therefrom.

The cooling passage 174A and the film air passage 174B are passages respectively branched from the manifold 174b in the cooling passage 174 according to the third embodiment. That is, the cooling passage 174A is a flow channel in which the cooling air passes through the contraction portion 174a and the manifold 174b in the cooling passage 174 according to the third embodiment toward the air injection holes 187. Meanwhile, the film air passage 174B is a flow channel in which the cooling air, as film air, passes through the contraction portion 174a and the manifold 174b in the cooling passage 174 according to the third embodiment toward the film air passage 192 according to the third embodiment. That is, the film air passage 192 according to the third embodiment forms a part (an apical end) of the film air passage 174B according to the fifth embodiment.

In the cooling passage 174A, a cooling air manifold 174Ab is provided between the manifold 174b and the air injection holes 187. The cooling air manifold 174Ab is formed over the entire periphery of the nozzle body 142 in an annular shape. The cooling air manifold l74Ab is formed inside of the film air passage 192 and outside of the manifold 173b on the apical end side, and formed on the apical end side than a film air manifold 174Bb described later. The cooling air manifold 174Ab communicates with the manifold 174b on the upstream side (base end side) thereof and communicates with the air injection holes 187 on the downstream side (apical end side) thereof.

In the film air passage 174B, the film air manifold 174Bb is provided between the manifold 174b and the film air passage 192 on the apical end side. The film air manifold 174Bb is formed over the entire periphery of the nozzle body 142 in an annular shape. The film air manifold 174Bb is formed on the outermost side and on the base end side than the cooling air manifold 174Ab. The film air manifold 174Bb communicates with the manifold 174b on the upstream side (base end side) thereof and communicates with the film air passage 192 on the apical end side on the downstream side (apical end side) thereof.

The cooling passage 174A and the film air passage 174B formed in this manner are arranged on the same circumference as the first fuel gas passage 173. The cooling passage 174A and the film air passage 174B are formed in a circular hole shape in cross section, and the first fuel gas passage 173 is formed in an elongated hole shape having an oval shape (for example, an elongated shape) in cross section. The cooling passage 174A and the film air passage 174B on the apical end side of the manifold 174b are formed in a plurality of numbers in the circumferential direction, and the first fuel gas passage 173 on the base end side of the manifold 173b is formed in a plurality of numbers in the circumferential direction. The plurality of cooling passages 174A and film air passages 174B, and the plurality of first fuel gas passages 173 are arranged alternately along the circumferential direction. The cooling passages 174A and the film air passages 1743 are arranged alternately along the circumferential direction.

Accordingly, the cooling air A that flows into the cooling passage 174 from the cooling-air supply port 66 passes through the contraction portion 174a, thereby stabilizing the circulation amount of the cooling air A flowing toward the apical end side. Thereafter, the cooling air A passes through the manifold 174b, thereby circulating around the whole circumference of the nozzle body 142. A part of the cooling air A having passed through the manifold 174b flows into the cooling passages 174A, and a part of the remaining cooling air A flows into the film air passages 174B. The cooling air A that flows into the cooling passages 174A passes through the cooling air manifolds 174Ab, thereby circulating around the whole circumference of the nozzle body 142. The cooling air A having passed through the cooling air manifolds 174Ab is injected from the air injection holes 187 toward the front of the nozzle body 142 and to the inner side of the nozzle body 142. Meanwhile, the cooling air A that flows into the film air passages 174B passes through the film air manifolds 174Bb, thereby circulating around the whole circumference of the nozzle body 142. The cooling air A having passed through the film air manifolds 174Bb is injected from the film air passage 192 on the apical end side toward the front of the nozzle body 142.

As described above, according to the fifth embodiment, the plurality of internal flow channels can be arranged in an arrangement pattern different from those of the first to fourth embodiments. That is, the fuel oil passage 175, the water passage 176, the first fuel gas passage 173, the second fuel gas passage 172, the cooling passages 174A, and the film air passages 174B can be the internal flow channels of the nozzle body 142.

The first to fifth embodiments have been described by applying the present invention to the pilot nozzles 59, 121, 131, and 141. However, the present invention is not particularly limited so long as the injection nozzle can inject cooling air toward the circulating flow, and can be applied to, for example, the main nozzle 62 according to the arrangement of the pilot nozzles 59, 121, 131, and 141 and the main nozzle 62.

REFERENCE SIGNS LIST 1 gas turbine
11 compressor
12 gas turbine combustor
13 turbine
14 power generator
20 air inlet
21 compressor casing
22 inlet guide vane
23 compressor vane
24 turbine blade
25 bleed air chamber
26 turbine casing
27 turbine vane
28 turbine blade
29 exhaust casing
30 exhaust chamber
31 exhaust diffuser
32 rotor
33, 34 bearing
35, 36, 37 leg portion
41 casing
42 combustor inner cylinder
42a large-diameter portion
43 combustor transition piece
44 pilot combustion burner
45 main combustion burner
46 bypass pipe
47 bypass valve
54 top hat portion
55 fastening bolt
56 air passage
57 supply passage
58 pilot cone
59 pilot nozzle
60 swirler vane
61 burner cylinder
62 main nozzle
63 swirler vane
64, 65 fuel port
66 cooling-air supply port
67 branch passage
71 nozzle body
72 first fuel passage
73 cooling passage
74 second fuel passage
75 first fuel injection hole
77 flow regulating valve
78 second fuel injection hole
79 air injection hole
91 control device
92 detection sensor
92a gas-component detection sensor
92b temperature sensor
92c pressure sensor
110 gas turbine combustor (second embodiment)
111 compressor (second embodiment)
120 gas turbine combustor (third embodiment)
121 pilot nozzle (third embodiment)
130 gas turbine combustor (fourth embodiment)
131 pilot nozzle (fourth embodiment)
140 gas turbine combustor (fifth embodiment)

141 pilot nozzle (fifth embodiment)
F1 fuel gas
F2 fuel gas
F3 fuel oil
A cooling air
W water

The invention claimed is:

1. A gas turbine combustor comprising:
an injection nozzle that can inject fuel and cooling air for cooling a pilot nozzle tip;
an air flow-rate adjuster that can adjust a flow rate of the cooling air to be supplied to the injection nozzle;
a detector that detects a combustion state of the fuel;
a controller configured to control the air flow-rate adjuster based on a detection result of the detector;
a pilot burner having therein a pilot nozzle comprising the pilot nozzle tip, the pilot nozzle being arranged at a center of the gas turbine combustor; and
a plurality of main burners respectively having therein a main nozzle arranged around the pilot burner, wherein
the controller increases the flow rate of the cooling air when a forming position of a circulating flow formed opposite to the injection nozzle is close to the injection nozzle relative to a reference position, and the controller decreases the flow rate of the cooling air when the forming position of the circulating flow is away from the injection nozzle relative to the reference position.

2. The gas turbine combustor according to claim 1, further comprising a cooling-air supply flow channel connected to the injection nozzle to supply the cooling air toward the injection nozzle, wherein
the air flow-rate adjuster has a flow regulating valve provided in the cooling-air supply flow channel.

3. The gas turbine combustor according to claim 1, further comprising a cooling-air supply flow channel connected to the injection nozzle to supply the cooling air toward the injection nozzle, wherein
the air flow-rate adjuster has a compressor that supplies the cooling air toward the cooling-air supply flow channel.

4. The gas turbine combustor according to claim 1, wherein
the injection nozzle includes
a plurality of internal flow channels formed therein from a nozzle base end side to a pilot nozzle tip side, through which the fuel and the cooling air can circulate respectively,
the plurality of internal flow channels include
a first fuel flow channel through which the fuel circulates toward the pilot nozzle tip,
a second fuel flow channel through which the fuel circulates toward the pilot nozzle tip, and
a cooling flow channel through which the cooling air circulates toward the pilot nozzle tip, and
the cooling flow channel is provided between the first fuel flow channel and the second fuel flow channel in a direction from an internal side toward an external side of the injection nozzle.

5. The gas turbine combustor according to claim 1, wherein
the injection nozzle includes
a plurality of internal flow channels formed therein from a nozzle base end side to a pilot nozzle tip side, through which the fuel and the cooling air can circulate respectively,
a contraction portion formed by narrowing down a part of at least one of the internal flow channels,
a manifold formed on an apical end side of the contraction portion to communicate with the internal flow channel, and
an injection hole that communicates with the manifold, wherein
one part of the plurality of internal flow channels is a cooling flow channel through which the cooling air circulates toward the pilot nozzle tip side.

6. The gas turbine combustor according to claim 5, wherein
the injection nozzle includes
a nozzle body provided to extend from the nozzle base end side toward the pilot nozzle tip side, and
a plurality of swirler vanes arranged and provided around the nozzle body with a predetermined gap therebetween, and
in the plurality of internal flow channels, the cooling flow channel, which is the part of the internal flow channels, is provided to extend from the nozzle base end side toward the pilot nozzle tip side, and
a fuel flow channel through which the fuel circulates, which is the other part of the internal flow channels, is provided to extend from the nozzle base end side toward the swirler vanes.

7. The gas turbine combustor according to claim 5, wherein the injection nozzle includes a nozzle body provided to extend from the nozzle base end side toward the pilot nozzle tip side, and a film-air flow channel formed around the nozzle body, through which film air circulates from the nozzle base end side toward the pilot nozzle tip side.

8. The gas turbine combustor according to claim 7, wherein the film-air flow channel communicates with an external flow channel formed outside of the nozzle body.

9. The gas turbine combustor according to claim 7, wherein one part of the plurality of internal flow channels is the film-air flow channel provided to extend from the nozzle base end side toward the pilot nozzle tip side.

10. The gas turbine combustor according to claim 7, wherein the cooling flow channel is provided inside of the injection nozzle with respect to the film-air flow channel.

11. A gas turbine comprising:
the gas turbine combustor according to claim 1, and
a turbine that is rotated by combustion gas generated by combusting the fuel in the gas turbine combustor.

12. The gas turbine combustor according to claim 1, wherein the detector is a pressure sensor that detects pressure fluctuations in a combustor inner cylinder in which the injection nozzle is arranged, and
the controller adjusts the flow rate of the cooling air based on the pressure fluctuations detected by the pressure sensor.

13. The gas turbine combustor according to claim 1, wherein the detector is a temperature sensor that detects the temperature of members that changes depending on the combustion state of the fuel, and
the controller increases the flow rate of the cooling air when the temperature detected by the temperature sensor is higher than a preset temperature.

14. A controller for a gas turbine combustor that includes an injection nozzle that can inject fuel and cooling air for cooling a pilot nozzle tip, an air flow-rate adjuster that can adjust a flow rate of the cooling air to be supplied to the injection nozzle, a detector that detects a combustion state of the fuel, a pilot burner having therein a pilot nozzle comprising the pilot nozzle tip, the pilot nozzle being arranged at a center of the gas turbine combustor, and a plurality of main burners respectively having therein a main nozzle arranged around the pilot burner, wherein
the controller is configured to control the air flow-rate adjuster based on a detection result of the detector, and increase the flow rate of the cooling air when a forming position of a circulating flow formed opposite to the injection nozzle is close to the injection nozzle relative to a reference position, and decrease the flow rate of the cooling air when the forming position of the circulating flow is away from the injection nozzle relative to the reference position.

15. A control method for a gas turbine combustor that includes an injection nozzle that can inject fuel and cooling air for cooling a pilot nozzle tip, an air flow-rate adjuster that can adjust a flow rate of the cooling air to be supplied to the injection nozzle, and a detector that detects a combustion state of the fuel, a pilot burner having therein a pilot nozzle comprising the pilot nozzle tip, the pilot nozzle being arranged at a center of the gas turbine combustor, a plurality of main burners respectively having therein a main nozzle arranged around the pilot burner, wherein the control method comprises:
controlling the air flow-rate adjuster with a controller configured to control the air flow-rate adjuster based on a detection result of the detector, wherein the flow rate of the cooling air is increased when a forming position of a circulating flow formed opposite to the injection nozzle is close to the injection nozzle relative to a reference position, and the flow rate of the cooling air is decreased when the forming position of the circulating flow is away from the injection nozzle relative to the reference position.

* * * * *